(12) United States Patent
Chen et al.

(10) Patent No.: US 8,076,820 B2
(45) Date of Patent: Dec. 13, 2011

(54) HIGH ENERGY DENSITY ELECTRO-OSMOTIC PUMP AND ACTUATOR

(75) Inventors: Reh-Lin Chen, Williamsville, NY (US); Bing-Chung Chen, Newbury Park, CA (US); Chung-Lung Chen, Thousand Oaks, CA (US); Chuan-Hua Chen, Durham, NC (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 1103 days.

(21) Appl. No.: 11/973,021

(22) Filed: Oct. 5, 2007

(65) Prior Publication Data
US 2008/0210559 A1    Sep. 4, 2008

Related U.S. Application Data

(60) Provisional application No. 60/849,867, filed on Oct. 6, 2006, provisional application No. 60/925,007, filed on Apr. 17, 2007.

(51) Int. Cl.
*F04F 99/00* (2009.01)
*H02N 11/00* (2006.01)

(52) U.S. Cl. ......................... 310/300; 417/48
(58) Field of Classification Search .......... 310/300; 417/48
See application file for complete search history.

(56) References Cited

U.S. PATENT DOCUMENTS

| | | | | |
|---|---|---|---|---|
| 3,850,203 A | * | 11/1974 | Shobert | 138/125 |
| 5,302,995 A | * | 4/1994 | Hayashi | 396/630 |
| 5,736,590 A | | 4/1998 | Rasmussen | 523/113 |
| 6,911,764 B2 | | 6/2005 | Pelrine et al. | 310/328 |
| 2003/0068229 A1 | * | 4/2003 | Ohkawa | 417/48 |
| 2004/0151962 A1 | * | 8/2004 | Adams | 429/34 |
| 2006/0023187 A1 | * | 2/2006 | Eaton | 355/53 |
| 2008/0102118 A1 | * | 5/2008 | Gan et al. | 424/468 |

OTHER PUBLICATIONS

Brock, et al., a Dynamic Model of a Linear Actuator based on Polymer Hydrogel, Proceedings of the Second International Conference on Intelligent Materials (ICIM94) (May 1994).
Shahinpoor, et al., Ionic Polymer-Metal Composites (IPMCs) as Biomimetic Sensors, Actuators and Artificial Muscles—a Review, Smart Mater. Struct. vol. 7, No. 6, pp. R15-R30 (Dec. 1998).
Bar-Cohen, Electroactive Polymers as Artificial Muscles—Reality and Challenges, American Institute of Aeronautics and Astronautics, Paper No. 2001-1492 (Apr. 16, 2001).

(Continued)

*Primary Examiner* — Thomas Dougherty
(74) *Attorney, Agent, or Firm* — Koppel, Patrick, Heybl & Philpott

(57) ABSTRACT

An electro-osmotic pump includes a pump chamber having a wall fabricated of an electric double layer material, the surface area of the electric double layer material being high relative to the volume of the chamber. An electric potential applied across the material causes a fluid in the chamber to be transported through the wall.

A nastic actuator includes the electro-osmotic pump and an actuator chamber, having a variable volume, coupled to the pump chamber. A superabsorbent polymer is disposed in the pump and actuator chambers, such that transport of the fluid into the pump chamber results in absorption of the fluid by the superabsorbent polymer, causing the actuator chamber to increase in volume. When the electric potential is applied across the superabsorbent polymer, the superabsorbent polymer expands, further causing the actuator chamber to increase in volume.

27 Claims, 5 Drawing Sheets

OTHER PUBLICATIONS

Cadogan, et al., Morphing Inflatable Wing Development for Compact Package Unmanned Aerial Vehicles, American Institute of Aeronautics and Astronautics, Paper No. 2004-1807 (Apr. 19, 2004).

Brock, Review of Artificial Muscle based on Contractile Polymers, MIT Artificial Intelligence Laboratory, Memo No. 1330 (Nov. 1991).

* cited by examiner

HIGH ENERGY DENSITY ELECTRO-OSMOTIC PUMP AND ACTUATOR

CROSS REFERENCE TO RELATED APPLICATIONS

This application claims the benefit under 35 USC 119(e) of U.S. Provisional Patent Application No. 60/849,867, filed Oct. 6, 2006, and U.S. Provisional Patent Application No. 60/925,007, filed Apr. 17, 2007.

GOVERNMENT RIGHTS

The United States Government has rights in this invention pursuant to a contract awarded by the Defense Advanced Research Projects Agency (DARPA) concerning nastic materials.

BACKGROUND OF THE INVENTION

This invention is concerned with high energy density pumping technology, specifically electro-osmotic pumps, and with the use of such pumps to implement nastic actuators.

In electrochemistry, physics and vascular plant biology, electro-osmosis is defined as the motion of ions in a solvent environment, under the influence of an applied electric field, through very narrow channels, as in a membrane or other porous structure, generally along a charged surface or through a non-macroporous material which has ionic sites and allows for the inflow or outflow of water (sometimes referred to as "chemical porosity"). Electro-osmotic flow can occur in natural unfiltered water, as well as buffered solutions.

The cause of electro-osmotic flow is an electrical double layer that forms at the stationary/solution interface. In capillary electrophoresis, the narrow channels are made up of silica, and silanol groups form the inner surface of the capillary column. These silanol groups are ionized when the pH is higher than 3. Thus, the inner surface of the channel is negatively charged. In solutions containing ions, the cations will migrate to the negatively charged wall, causing the formation of the electric double layer.

When an electrical potential is applied to the column, with an anode at one end of the column and a cathode at the other, the cations will migrate towards the cathode. Since these cations are solvated and clustered at the walls of the channel, they drag the rest of the solution with them, even the anions. This results in an electro-osmotic flow. Any combination of an electrolyte (a fluid containing dissolved ions) and an insulating solid will generate electro-osmotic flow.

Interest in electro-osmotic flow has increased with the realization that this mechanism provides a very efficient way to generate fluid flows in microfluidic devices, with some electro-osmotic pumps capable of generating flow rates as large as a few milliliters per minute and others producing pressures as large as hundreds of atmospheres.

One application for which electro-osmotic pumps are particularly suited is nastic actuation. In biological systems, nastic movements, usually associated with plants, are rapid, reversible responses to changes in the environment, such as temperature, humidity or light irradiance. These movements are caused by changes in the water pressure inside the plant and can result in very large changes in shape. An example of such a response is the opening and closing of flowers (photonastic response).

Actuators are devices that transform an input of energy into mechanical work. Most actuators use electricity for the driving energy, but nastic actuators function due to an increase in internal osmotic pressure. Each actuator can be very small, allowing a structure to be packed with them, the individual work of each actuator adding up to result in a wide range of movement, enabling net shape change.

Research in nastic materials is developing synthetic intelligent materials that utilize internal pressure changes to effect controlled shape changes, for a new generation of biologically inspired engineering systems. Researchers are working on using nastic materials, for example, to create a morphing aircraft wing that could dynamically change shape and control surfaces during flight. Airplane wings imbued with such ability might, for example, self-trim as they sensed the plane's speed, or prepare for an imminent landing by cupping the air as a bird's wing does. Actuation mechanisms generate axial extension/contraction and bending by incorporating active transport control to actuate nastic structures.

Active actuation materials can generate large strains while carrying significant structural loads. Nastic structures capable of shape change can be configured with arrays of miniature hydraulic actuators, with distributed fluid, active transport control mechanisms. A distributed hydraulic actuator could potentially match the energy density of traditional hydraulic systems. Without a centralized hydraulic pump, such a hydraulic system is operated by distributed active control based on electro-osmotic transport of a working fluid.

These devices can be synergistically integrated with mechanisms employing superabsorbent polymers (SAP) that can absorb and retain extremely large amounts of a liquid relative to their own mass. SAPs, or hydrogels, are cross-linked networks of flexible polymer chains carrying ionic functional groups. These fixed ionic groups attract counter ions and gradients of ionic concentrations give rise to osmotic pressure that drives the swelling of an SAP in an aqueous environment. The total absorbency and swelling capacity are controlled by the type and degree of cross-linking to the polymer. The absorbability of the SAP can be electrochemically controlled to regulate swelling, shrinkage and pressure, thereby altering the cell size of a nastic structure.

Electro-osmotic pumps in the prior art utilize a disk-shaped electric double layer (EDL) material to create the pumping action. Such a shape, however, has a limited surface area and thus cannot sustain a high back pressure, because of its flat geometry. The limited surface area consequently limits the pumping flow rate that can be sustained by such an electro-osmotic pump.

Consequently, a need has developed in the art for an electro-osmotic pump with a larger active pumping surface area and a design that is mechanically able to withstand high pressures. Existing pump designs can provide either a relatively high pressure or a relatively high flow rate, but not both. It would be desirable to provide an electro-osmotic pump that can provide both of these features, i.e., a pump that will operate with a high energy density.

BRIEF SUMMARY OF THE INVENTION

This invention provides a new pump capable of supplying higher energy densities than electro-osmotic pumps known in the prior art. The invention also encompasses new actuator designs exploiting this pump.

An electro-osmotic pump made according to the invention includes a pump chamber having a wall that is fabricated of an electric double layer (EDL) material, the surface area of the EDL material being high relative to the volume of the chamber. When an electric potential is applied across the EDL material, a fluid in the chamber is transported through the wall.

The pump may be equipped with electrodes, connected to the EDL material, for applying the electric potential. Reversing the direction of the electric potential applied to the electrodes will cause the direction in which the fluid is transported to reverse.

In a more particular embodiment, the pore size of the electric double layer material is made sufficiently small and the surface area of the electric double layer material is made sufficiently large to ensure at least a predetermined flow rate and pressure for the transported fluid.

In another embodiment, the chamber is cylindrical in shape, so that the electric potential applied across the EDL material causes the fluid to be transported through the wall in a radial direction with respect to the axis of the cylinder. Alternative shapes for the chamber can include, inter alia, a toroidal chamber or a chamber that is rectangular in cross section.

Particular materials that may be used for the EDL material include, but are not limited to, glass frits and alumina.

One application in which the pump of this invention may be used to advantage is as a pressure sprayer for cooling an object, in which case a nozzle is coupled to the pump chamber for directing the pressurized cooling fluid onto the object.

A nastic actuator constructed according to the invention includes an electro-osmotic pump, with a pump chamber having a wall, at least a portion of the wall being fabricated of an electric double layer material whose surface area is high relative to the volume of the chamber, such that an electric potential, when applied across the material in a first direction, causes a fluid in the chamber to be transported through the wall into the pump chamber, and when applied across the material in a second direction, causes the fluid to be transported through the wall out of the pump chamber.

An actuator chamber, having a variable volume, is coupled to the pump chamber. A superabsorbent polymer (SAP) is disposed in the pump chamber and in the actuator chamber, such that transport of the fluid into the pump chamber results in absorption of the fluid by the superabsorbent polymer, causing the actuator chamber to increase in volume.

When the electric potential is applied across the superabsorbent polymer in the first direction, the superabsorbent polymer expands, further causing the actuator chamber to increase in volume.

Transport of the fluid out of the pump chamber results in release of the fluid from the superabsorbent polymer, causing the actuator chamber to decrease in volume. Moreover, when the electric potential is applied across the superabsorbent polymer in the second direction, the superabsorbent polymer contracts, thereby further causing the actuator chamber to decrease in volume.

Electrodes may be connected to the EDL material for applying the electric potential. Because SAP materials may be damage by electrical fields, the SAP may be isolated from the electrodes to eliminate adverse electrochemical reactions and thereby avoid degradation of the superabsorbent polymer. In a more particular embodiment, the SAP may be an ionic hydrogel.

In one more specific embodiment of the actuator, the pump chamber is a first pump chamber, the actuator chamber is a first actuator chamber, and the SAP is a first superabsorbent polymer, with the actuator also including a second pump chamber, such that the electric potential, when applied across the wall in the first direction, causes the fluid to be transported through the wall from the second pump chamber to the first pump chamber, and when applied across the wall in the second direction, causes the fluid to be transported through the wall from the first pump chamber to the second pump chamber. Additional elements in this embodiment include a second actuator chamber coupled to the second pump chamber and a second superabsorbent polymer disposed in the second pump chamber and the second actuator chamber, such that transport through the wall from the first pump chamber to the second pump chamber results in absorption of the fluid by the second SAP, causing the second actuator chamber to increase in volume, and such that transport of the fluid from the second pump chamber to the first pump chamber results in release of the fluid from the second SAP, causing the second actuator chamber to decrease in volume.

In addition, when the electric potential is applied across the second SAP in the second direction, the second SAP expands, further causing the second actuator chamber to increase in volume, and when the electric potential is applied across the second SAP in the first direction, the second SAP contracts, further causing the second actuator chamber to decrease in volume.

In another alternative embodiment of the actuator, the first pump chamber is cylindrical, the second pump chamber is cylindrical, and the second pump chamber surrounds, and is concentric with, the first pump chamber.

The zeta potential of the first electro-osmotic pump may be selected to be opposite to the zeta potential of the second electro-osmotic pump.

Another nastic actuator constructed according to the invention includes an electro-osmotic pump, including a first pump chamber, a second pump chamber, a fluid in the first and second pump chambers, and a wall common to the first and second pump chambers. At least a portion of the wall is fabricated of an electric double layer material, the surface area of the EDL material being high relative to the volume of the first pump chamber and relative to the volume of the second pump chamber. When an electric potential is applied across the material in a first direction, the fluid is transported through the wall from the second pump chamber to the first pump chamber, and when it is applied across the material in a second direction, the fluid is transported through the wall from the first pump chamber to the second pump chamber.

A first actuator chamber, having a first variable volume, is coupled to the first pump chamber and a second actuator chamber, having a second variable volume, is coupled to the second pump chamber. A first SAP is disposed in the first pump chamber and the first actuator chamber, while a second SAP is disposed in the second pump chamber and the second actuator chamber;

With this configuration, transport of the fluid from the first pump chamber to the second pump chamber results in absorption of the fluid by the second superabsorbent polymer, causing the second actuator chamber to increase in volume, and in release of the fluid by the first superabsorbent polymer, causing the first actuator chamber to decrease in volume.

In addition, the electric potential, when applied across the first and second superabsorbent polymers in the second direction, causes the second superabsorbent polymer to expand, further causing the second actuator chamber to increase in volume, and causes the first superabsorbent polymer to contract, further causing the first actuator chamber to decrease in volume.

Transport of the fluid from the second pump chamber to the first pump chamber results in absorption of the fluid by the first superabsorbent polymer, causing the first actuator chamber to increase in volume, and in release of the fluid by the second superabsorbent polymer, causing the second actuator chamber to decrease in volume.

The electric potential, when applied across the first and second superabsorbent polymers in the first direction, causes the first superabsorbent polymer to expand, further causing the first actuator chamber to increase in volume, and causes the second superabsorbent polymer to contract, further causing the second actuator chamber to decrease in volume.

A particularly advantageous feature of this embodiment may be employed by mechanically coupling the first and second actuator chambers, so that expansion of the first actuator chamber, and contraction of the second actuator chamber, causes the actuator chambers to bend in a first direction. Expansion of the second actuator chamber, and contraction of the first actuator chamber, causes the actuator chambers to bend in a second direction, thereby enabling the actuator to be used to impart a bending movement.

The invention also embraces a structure with distributed shape control, which employs a plurality of nastic actuators distributed in the structure, each actuator including an electro-osmotic pump, including a pump chamber having a wall, at least a portion of the wall being fabricated of an electric double layer material, the surface area of the electric double layer material being high relative to the volume of the chamber, such that an electric potential, when applied across the material in a first direction, causes a fluid in the chamber to be transported through the wall into the pump chamber, and when applied across the material in a second direction, causes the fluid to be transported through the wall out of the pump chamber. An actuator chamber, having a variable volume, is coupled to each pump chamber; and a superabsorbent polymer is disposed in each pump and actuator chamber, such that transport of the fluid into the pump chamber results in absorption of the fluid by the superabsorbent polymer, causing the actuator chamber to increase in volume.

Transport of the fluid out of the pump chamber results in release of the fluid from the superabsorbent polymer, causing the actuator chamber to decrease in volume. The electric potential, when applied across the superabsorbent polymer in the second direction, causes the superabsorbent polymer to contract, further causing the actuator chamber to decrease in volume.

This structure may be coupled to a control system connected to the plurality of nastic actuators to selectively operate each actuator. In this manner, the shape of the structure may be altered in the area of each actuator to achieve a predetermined overall configuration of the structure. Moreover, the actuators may be distributed in a surface of the structure, with the control system configured to control the surface roughness of the structure.

The invention also contemplates methods for making an electro-osmotic pump, cooling an object, making a nastic actuator, and implementing distributed shape control in a structure.

DETAILED DESCRIPTION OF THE INVENTION

Figure 1:
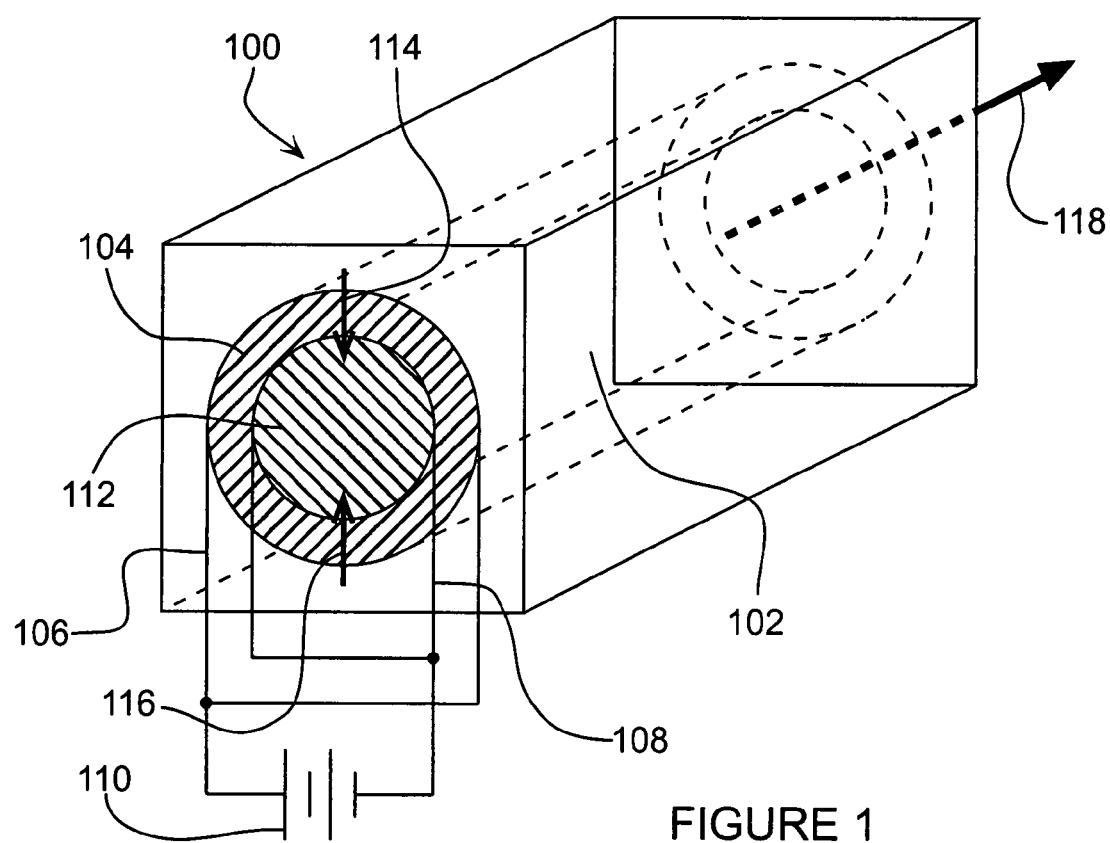
FIG. 1 is a schematic perspective view illustrating an electro-osmotic pump of the invention.

FIG. 1 illustrates, in a schematic perspective view, an electro-osmotic pump 100 made according to the invention. The pump includes a cylindrical pump chamber 102 having a wall 104 that is fabricated of an electric double layer (EDL) material, the cylindrical shape causing the surface area of the EDL material to be high relative to the volume of the chamber.

Electrodes 106 and 108 are connected to the wall 104, so that when the electrodes are connected to an electric potential 110, the electric potential is applied across the EDL material, causing a fluid 112 in the chamber to be transported through the wall. When this transport of the fluid is directed into the chamber, as depicted by the arrows 114 and 116, the flow increases the pressure of the fluid in the chamber, as indicated by the arrow 118, representing the outward force that can be exerted by the pressurized fluid. Reversing the direction of the electric potential applied to the electrodes will cause the direction in which the fluid is transported to be reversed.

The pore size of the electric double layer material may be made sufficiently small, and the surface area of the material sufficiently large, to ensure a predetermined high flow rate and pressure for the transported fluid. Although the embodiment depicted in FIG. 1 employs a pump chamber that is cylindrical in shape, such that the fluid is transported through the wall in a radial direction with respect to the cylindrical axis of the chamber, other chamber shapes, such as a toroid or a chamber with a rectangular cross section, can be used, so long as the surface area of the EDL material is high relative to the volume of the chamber.

Figure 2:
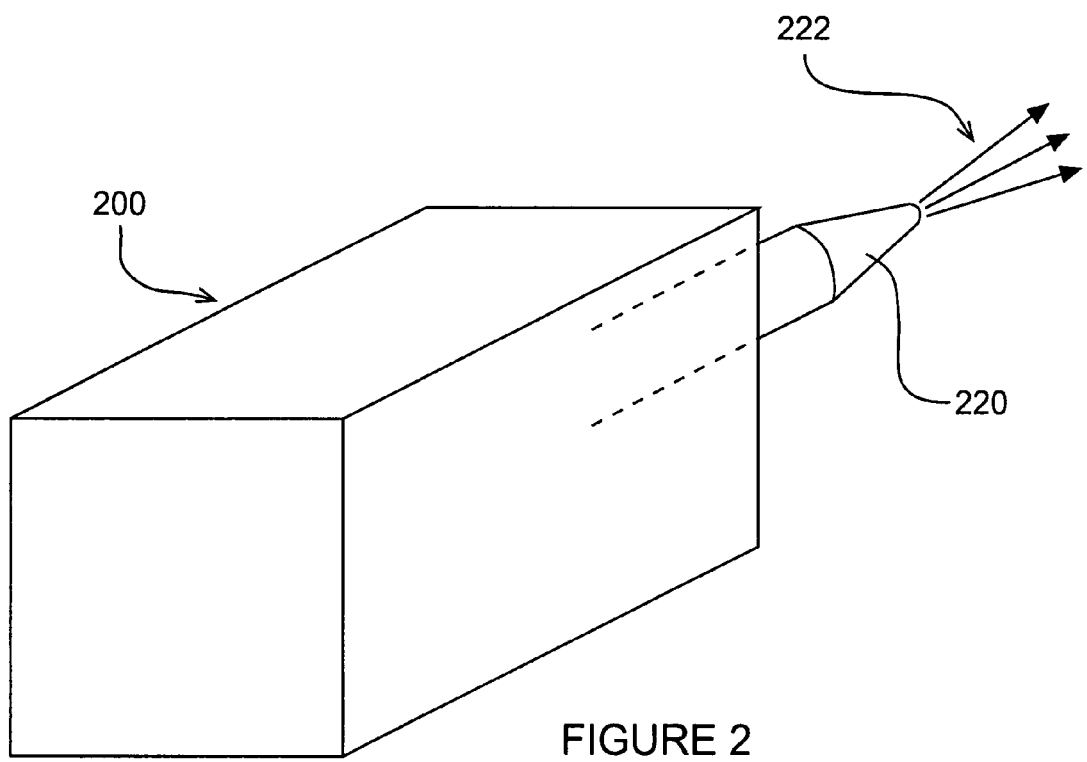
FIG. 2 shows an electro-osmotic pump used as a sprayer.

A variety of electric double layer materials, such as, for example, a glass frit or alumina, can be used for the wall. An application for which the pump of this invention is particularly well suited is to spray a fluid. FIG. 2 shows an electro-osmotic pump 200, similar to the pump 100 of FIG. 1, with a nozzle 220 connected to the pump chamber of the pump 200, such that the fluid in the pump chamber can be caused to spray out the nozzle, as indicated by the arrows 222.

Figure 3:
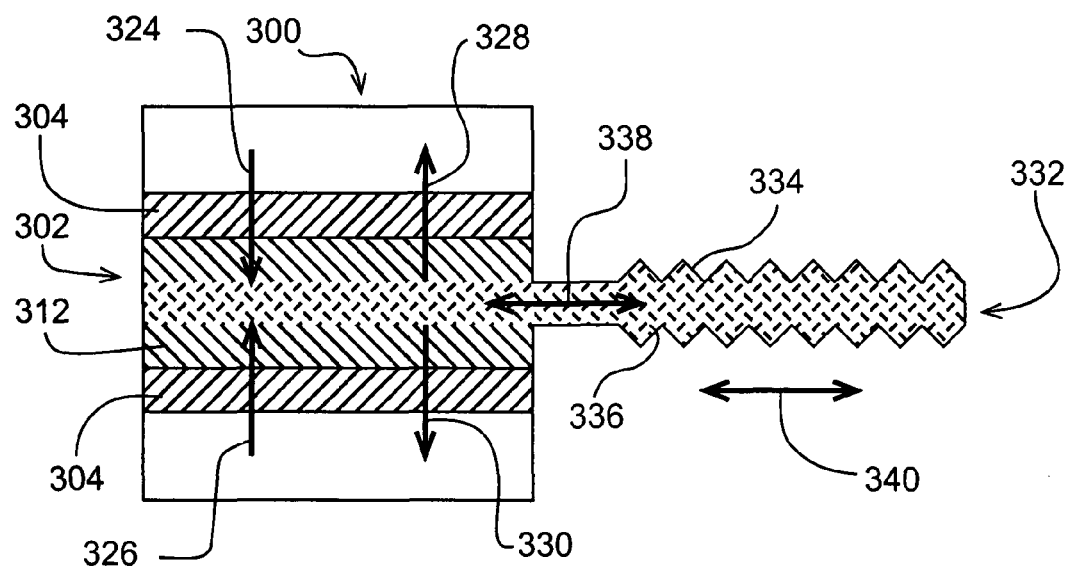
FIG. 3 is a nastic actuator constructed according to the present invention.

One embodiment of a nastic actuator constructed in accordance with the invention is depicted in a cross sectional schematic view in FIG. 3. This actuator includes an electro-osmotic pump 300, with a cylindrical pump chamber 302 having a wall 304, at least a portion of the wall being fabricated of an electric double layer material whose surface area is high relative to the volume of the chamber.

An electric potential can be applied across the wall 304 in a manner similar to that shown in FIG. 1 (i.e., with electrodes 106 and 108, and electric potential 110). When the electric potential is applied across the material in a first direction, a fluid 312 in the chamber 302 is transported through the wall into the pump chamber, as depicted by the arrows 324 and 326. When the potential is applied across the material in the opposite direction, the fluid is transported through the wall out of the pump chamber, as depicted by the arrows 328 and 330.

An actuator chamber 332, having a variable volume as provided by, for example, the bellows 334, is coupled to the pump chamber 302. A superabsorbent polymer (SAP) 336 is disposed in the pump chamber and the actuator chamber, such that transport of the fluid 312 into the pump chamber results in absorption of the fluid by the superabsorbent polymer 336, causing the actuator chamber to increase in volume.

When the electric potential is applied across the SAP 336 in the first direction, the potential causes the SAP to expand, further causing the actuator chamber to increase in volume. Transport of the fluid out of the pump chamber results in release of the fluid from the superabsorbent polymer, causing the actuator chamber to decrease in volume.

When the electric potential is applied across the superabsorbent polymer in the second direction, the superabsorbent polymer contracts, thereby further causing the actuator chamber to decrease in volume. Because electrical fields may damage SAP materials, the SAP may be isolated from the electrodes to eliminate adverse electrochemical reactions and thereby avoid degradation of the superabsorbent polymer. In a more particular embodiment, the SAP may be an ionic hydrogel.

When the pump 300 is used to force fluid into the pump chamber 302 and hence into the actuator chamber 332, the actuator chamber is caused to expand. Conversely, when the pump draws fluid out of the pump chamber, the actuator chamber will contract. Relative motion of the fluid 312 into and out of the actuator chamber is represented by the double arrow 338. The resulting linear motion of the actuator chamber, as depicted by the double arrow 340, can be used to exert an outward or inward force.

Figure 4:
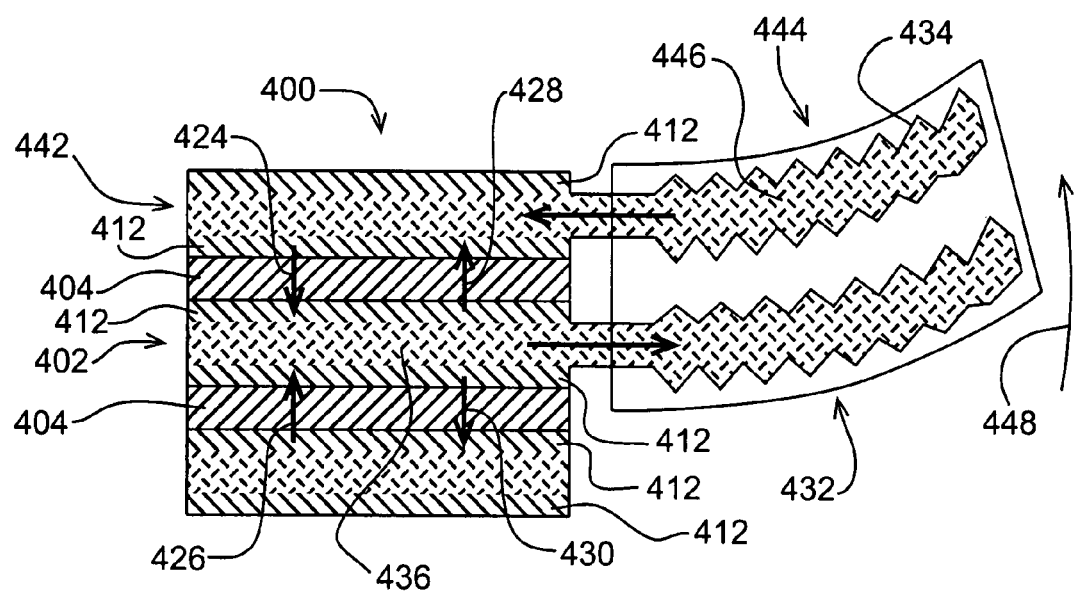
FIG. 4 depicts another embodiment of a nastic actuator constructed according to the invention.

In another embodiment of an actuator constructed according to the invention, as depicted by the cross sectional schematic view of FIG. 4, an electro-osmotic pump 400 includes a first pump chamber 402, with a wall 404 of electric double layer material, as well as a second pump chamber 442.

A first actuator chamber 432, having a variable volume, is coupled to the first pump chamber 402, while a second actuator chamber 444, also having a variable volume, is couple to the second pump chamber 442. When an electric potential is connected across the material in a first direction, it causes a fluid 412 to be transported from the second pump chamber 442 into the first pump chamber 402, as shown by the arrows 424 and 426. When the potential is applied across the material in a second, opposite direction, the fluid is transported through the wall from the first pump chamber to the second pump chamber, as depicted by the arrows 428 and 430.

A first superabsorbent polymer 436 is located within the first pump chamber 402 and the first actuator chamber 432, while a second superabsorbent polymer 446 is positioned within the second pump chamber 442 and the second actuator chamber 444. Transport of the fluid from the first pump chamber 402 to the second pump chamber 442 results in absorption of the fluid by the second superabsorbent polymer 446, causing the second actuator chamber 444 to increase in volume, and results in release of the fluid by the first superabsorbent polymer 436, causing the first actuator chamber 432 to decrease in volume.

In addition the electric potential, when applied across the first and second superabsorbent polymers in the second direction, causes the second superabsorbent polymer 446 to expand, further causing the second actuator chamber 444 to increase in volume, and causes the first superabsorbent polymer 436 to contract, further causing the first actuator chamber 432 to decrease in volume.

Transport of the fluid from the second pump chamber 442 to the first pump chamber 402 results in absorption of the fluid by the first superabsorbent polymer 436, causing the first actuator chamber 432 to increase in volume, and results in release of the fluid by the second superabsorbent polymer 446, causing the second actuator chamber 444 to decrease in volume.

The electric potential, when applied across the first and second superabsorbent polymers in the first direction, causes the first superabsorbent polymer 436 to expand, further causing the first actuator chamber 432 to increase in volume, and causes the second superabsorbent polymer 446 to contract, further causing the second actuator chamber 444 to decrease in volume.

When the first and second actuator chambers are coupled, as depicted in the figure, expansion of the first actuator chamber and contraction of the second actuator chamber causes the actuator chambers to bend in a first direction, as depicted by the arrow 448. Conversely, expansion of the second actuator chamber and contraction of the first actuator chamber causes the actuator chambers to bend in the opposite direction.

In embodiments of the actuator employing multiple pump chambers, it may be advantageous to use a first electric double layer material, associated with the first pump chamber, having a zeta potential opposite to that of a second electric double layer material associated with the second pump chamber.

Figure 5:
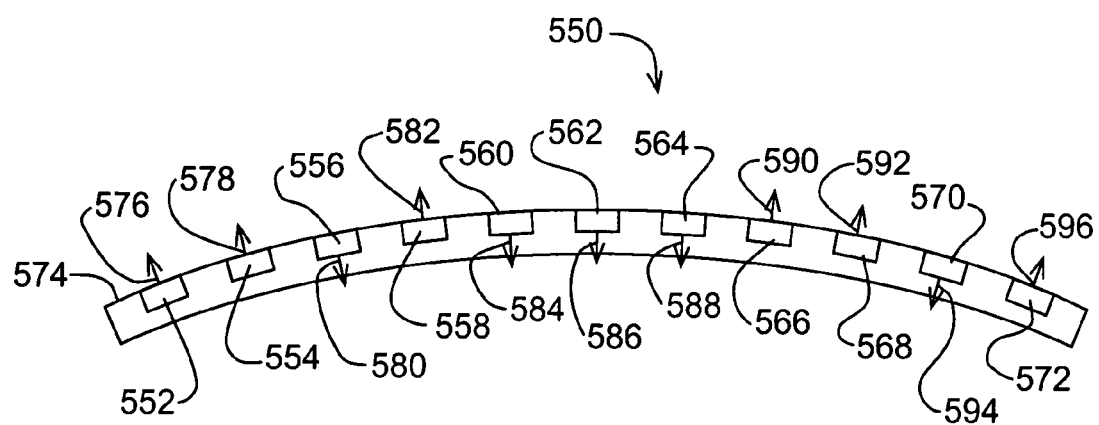
FIG. 5 illustrates a structure with distributed shape control constructed according to the present invention.

A structure 550 with distributed shape control, according to this invention, is depicted in the cross sectional schematic view of FIG. 5. The structure includes an array 552-572 of nastic actuators distributed in a surface 574 of the structure.

Each actuator includes, similar to the actuator embodiments described above, an electro-osmotic pump, including a pump chamber having a wall, at least a portion of the wall being fabricated of an electric double layer material, with the surface area of the EDL material being high relative to the volume of the chamber. An electric potential, when applied across the material in a first direction, causes a fluid in the chamber to be transported through the wall into the chamber, and when applied across the material in a second direction, causes the fluid to be transported through the wall out of the chamber. An actuator chamber, having a variable volume, is coupled to each pump chamber, and a superabsorbent polymer is disposed in each pump chamber and actuator chamber, such that transport of the fluid into the pump chamber and the actuator chamber results in absorption of the fluid by the superabsorbent polymer, causing the actuator chamber to increase in volume.

The electric potential, when applied across the superabsorbent polymer in the first direction, causes the superabsorbent polymer to expand, further causing the actuator chamber to increase in volume Transport of the fluid out of the pump chamber results in release of the fluid from the superabsorbent polymer, causing the actuator chamber to decrease in volume, while the electric potential, when applied across the superabsorbent polymer in the second direction, causes the superabsorbent polymer to contract, further causing the actuator chamber to decrease in volume.

When such a structure is coupled to a control system connected to the plurality of nastic actuators, as will be appreciated by those skilled in the art, each actuator can be selectively operated. In this manner, the shape of the structure may be altered in the area of each actuator, as indicated by the series of arrows 576-596, to achieve a predetermined overall configuration of the structure. If the actuators are distributed in a surface of the structure, as depicted in FIG. 5, the control system can be configured to control the surface roughness of the structure.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The invention claimed is:
1. An electro-osmotic pump, comprising:
a pump chamber having a wall, at least a portion of the wall being fabricated of an electric double layer (EDL) mate- rial having an inner surface and an outer surface, the surface area of the EDL material being high relative to the volume of the chamber, such that an electric potential applied between the inner surface and outer surface of the EDL material causes a fluid in the chamber to be transported radially through the wall.

2. The pump of claim 1, further comprising electrodes connected to the inner surface and the outer surface of said electric double layer material for applying the electric potential.

3. The pump of claim 2, wherein the direction in which the fluid is transported is reversible by reversing the direction of the electric potential applied to the electrodes.

4. The pump of claim 1, wherein the pore size of the electric double layer material is sufficiently small and the surface area of the electric double layer material is sufficiently large to ensure at least a predetermined flow rate and pressure of the transported fluid.

5. The pump of claim 1, wherein the chamber is cylindrical, such that the electric potential applied across the electric double layer material causes the fluid to be transported through the wall in a radial direction with respect to the axis of the cylinder.

6. The pump of claim 1, wherein the chamber is toroidal.

7. The pump of claim 1, wherein the chamber is rectangular in cross section.

8. The pump of claim 1, wherein the electric double layer material is a glass frit.

9. The pump of claim 1, wherein the electric double layer material is alumina.

10. An electro-osmotic pump, comprising:

a cylindrical pump chamber having a wall, at least a portion of the wall being fabricated of an electric double layer (EDL) material having an inner surface and an outer surface, such that an electric potential applied between the inner surface and outer surface of the EDL material causes a fluid in the chamber to be transported through the wall in a radial direction with respect to the axis of the cylinder.

11. A nastic actuator, comprising:

an electro-osmotic pump, including a pump chamber having a wall, at least a portion of the wall being fabricated of an electric double layer material, the surface area of the electric double layer material being high relative to the volume of the pump chamber, such that an electric potential, when applied across the material in a first direction, causes a fluid in the pump chamber to be transported through the wall into the pump chamber, and when applied across the material in a second direction, causes the fluid to be transported through the wall out of the pump chamber;

an actuator chamber, having a variable volume, coupled to the pump chamber; and a superabsorbent polymer disposed in the pump chamber and the actuator chamber, such that transport of the fluid into the pump chamber results in absorption of the fluid by the superabsorbent polymer, causing the actuator chamber to increase in volume, such that the electric potential, when applied across the superabsorbent polymer in the first direction, causes the superabsorbent polymer to expand, further causing the actuator chamber to increase in volume, such that transport of the fluid out of the pump chamber results in release of the fluid from the superabsorbent polymer, causing the actuator chamber to decrease in volume, and such that the electric potential, when applied across the superabsorbent polymer in the second direction, causes the superabsorbent polymer to contract, thereby further causing the actuator chamber to decrease in volume.

12. The actuator of claim 11, further comprising electrodes connected to the electric double layer material for applying the electric potential.

13. The actuator of claim 12, wherein the superabsorbent polymer is isolated from direct contact with the electrodes to eliminate adverse electrochemical reactions and thereby avoid degradation of the superabsorbent polymer.

14. The actuator of claim 11, wherein the superabsorbent polymer comprises an ionic hydrogel.

15. The actuator of claim 11, wherein the pump chamber is a first pump chamber, the actuator chamber is a first actuator chamber, the superabsorbent polymer is a first superabsorbent polymer, and further comprising:

a second pump chamber, the surface area of the electric double layer material being high relative to the volume of the second pump chamber, such that the electric potential, when applied across the wall in the first direction, causes the fluid to be transported through the wall from the second pump chamber to the first pump chamber, and when applied across the wall in the second direction, causes the fluid to be transported through the wall from the first pump chamber to the second pump chamber;

a second actuator chamber; having a variable volume, coupled to the second pump chamber; and a second superabsorbent polymer disposed in the second pump chamber and the second actuator chamber, such that transport of the fluid from the first pump chamber to the second pump chamber results in absorption of the fluid by the second superabsorbent polymer, causing the second actuator chamber to increase in volume, such that the electric potential, when applied across the second superabsorbent polymer in the second direction, causes the second superabsorbent polymer to expand, further causing the second actuator chamber to increase in volume, such that transport of the fluid from the second pump chamber to the first pump chamber results in release of the fluid from the second superabsorbent polymer, causing the second actuator chamber to decrease in volume, and such that the electric potential, when applied across the second superabsorbent polymer in the first direction, cause the second superabsorbent polymer to contract, further causing the second actuator chamber to decrease in volume.

16. The actuator of claim 15, wherein the first pump chamber is cylindrical, the second pump chamber is cylindrical, and the second pump chamber surrounds, and is concentric with, the first pump chamber.

17. The actuator of claim 15, wherein the zeta potential of the first electro-osmotic pump is opposite to the zeta potential of the second electro-osmotic pump.

18. A nastic actuator, comprising:

an electro-osmotic pump, including a first pump chamber, a second pump chamber, a fluid in the first and second pump chambers, and a wall common to the first and second pump chambers, at least a portion of the wall being fabricated of an electric double layer material, the surface area of the electric double layer material being high relative to the volume of the first pump chamber and relative to the volume of the second pump chamber, such that an electric potential, when applied across the material in a first direction, causes the fluid to be transported through the wall from the second pump chamber to the first pump chamber, and when applied across the material in a second direction, causes the fluid to be transported through the wall from the first pump chamber to the second pump chamber;

a first actuator chamber, having a first variable volume, coupled to the first pump chamber;

a second actuator chamber, having a second variable volume, coupled to the second pump chamber;

a first superabsorbent polymer disposed in the first pump chamber and the first actuator chamber;

a second superabsorbent polymer disposed in the second pump chamber and the second actuator chamber;

such that transport of the fluid from the first pump chamber to the second pump chamber results in absorption of the fluid by the second superabsorbent polymer, causing the second actuator chamber to increase in volume, and results in release of the fluid by the first superabsorbent polymer, causing the first actuator chamber to decrease in volume, such that the electric potential, when applied across the first and second superabsorbent polymers in the second direction, causes the second superabsorbent polymer to expand, further causing the second actuator chamber to increase in volume, and causes the first superabsorbent polymer to contract, further causing the first actuator chamber to decrease in volume, such that transport of the fluid from the second pump chamber to the first pump chamber results in absorption of the fluid by the first superabsorbent polymer, causing the first actuator chamber to increase in volume, and results in release of the fluid by the second superabsorbent polymer, causing the second actuator chamber to decrease in volume, and such that the electric potential, when applied across the first and second superabsorbent polymers in the first direction, causes the first superabsorbent polymer to expand, further causing the first actuator chamber to increase in volume, and causes the second superabsorbent polymer to contract, further causing the second actuator chamber to decrease in volume.

19. The actuator of claim 18, wherein the first and second actuator chambers are coupled, so that expansion of the first actuator chamber, and contraction of the second actuator chamber, cause the actuator chambers to bend in a first direction and expansion of the second actuator chamber, and contraction of the first actuator chamber, cause the actuator chambers to bend in a second direction.

20. A structure with distributed shape control, comprising:
a plurality of nastic actuators distributed in the structure, each actuator including:
an electro-osmotic pump, including a pump chamber having a wall, at least a portion of the wall being fabricated of an electric double layer material, the surface area of the electric double layer material being high relative to the volume of the pump chamber, such that an electric potential, when applied across the material in a first direction, causes a fluid in the pump chamber to be transported through the wall into the pump chamber, and when applied across the material in a second direction, causes the fluid to be transported through the wall out of the pump chamber;

an actuator chamber, having a variable volume, coupled to the pump chamber; and a superabsorbent polymer disposed in the pump chamber and the actuator chamber, such that transport of the fluid into the pump chamber results in absorption of the fluid by the superabsorbent polymer, causing the actuator chamber to increase in volume, such that the electric potential, when applied across the superabsorbent polymer in the first direction, causes the superabsorbent polymer to expand, further causing the actuator chamber to increase in volume, such that transport of the fluid out of the pump chamber results in release of the fluid from the superabsorbent polymer, causing the actuator chamber to decrease in volume, and such that the electric potential, when applied across the superabsorbent polymer in the second direction, causes the superabsorbent polymer to contract, further causing the actuator chamber to decrease in volume.

21. The structure of claim 20, further comprising a control system connected to the plurality of nastic actuators to selectively operate each actuator in a manner to change the shape of the structure, in the area of each actuator, to achieve a predetermined overall configuration of the structure.

22. The structure of claim 21, wherein the actuators are distributed in a surface of the structure and the control system is configured to control the surface roughness of the structure.

23. A method of making an electro-osmotic pump, comprising:
providing a pump chamber having a wall, at least a portion of the wall being fabricated of an electric double layer (EDL) material having an inner surface and an outer surface, the surface area of the EDL material being high relative to the volume of the chamber, such that an electric potential applied between the inner surface and outer surface of the EDL material causes a fluid in the chamber to be transported radially through the wall.

24. The method of claim 23, further comprising:
making the pore size of the electric double layer material sufficiently small, and
making the surface area of the electric double layer material sufficiently large to ensure at least a predetermined flow rate and pressure of the transported fluid.

25. A method of making a nastic actuator, comprising:
providing an electro-osmotic pump, including a pump chamber having a wall, at least a portion of the wall being fabricated of an electric double layer material, the surface area of the electric double layer material being high relative to the volume of the pump chamber, such that an electric potential, when applied across the material in a first direction, causes a fluid in the pump chamber to be transported through the wall into the pump chamber, and when applied across the material in a second direction, causes the fluid to be transported through the wall out of the pump chamber;

coupling an actuator chamber, having a variable volume, to the pump chamber; and disposing a superabsorbent polymer in the pump chamber and in the actuator chamber, such that transport of the fluid into the pump chamber results in absorption of the fluid by the superabsorbent polymer, causing the actuator chamber to increase in volume, such that the electric potential, when applied across the superabsorbent polymer in the first direction, causes the superabsorbent polymer to expand, further causing the actuator chamber to increase in volume, such that transport of the fluid out of the pump chamber results in release of the fluid from the superabsorbent polymer, causing the actuator chamber to decrease in volume, and such that the electric potential, when applied across the superabsorbent polymer in the second direction, causes the superabsorbent polymer to contract, thereby further causing the actuator chamber to decrease in volume.

26. A method of implementing distributed shape control in a structure, comprising:

embedding a plurality of nastic actuators in the structure, including, for each actuator:

providing an electro-osmotic pump, including a pump chamber having a wall, at least a portion of the wall being fabricated of an electric double layer material, the surface area of the electric double layer material being high relative to the volume of the pump chamber, such that an electric potential, when applied across the material in a first direction, causes a fluid in the pump chamber to be transported through the wall into the pump chamber, and when applied across the material in a second direction, causes the fluid to be transported through the wall out of the pump chamber;

coupling an actuator chamber, having a variable volume, to the pump chamber; and disposing a superabsorbent polymer in the pump chamber and in the actuator chamber, such that transport of the fluid into the pump chamber results in absorption of the fluid by the superabsorbent polymer, causing the actuator chamber to increase in volume, such that the electric potential, when applied across the superabsorbent polymer in the first direction, causes the superabsorbent polymer to expand, further causing the actuator chamber to increase in volume, such that transport of the fluid out of the pump chamber results in release of the fluid from the superabsorbent polymer, causing the actuator chamber to decrease in volume, and such that the electric potential, when applied across the superabsorbent polymer in the second direction, causes the superabsorbent polymer to contract, further causing the actuator chamber to decrease in volume.

27. The method of claim 26, further comprising distributing the actuators in a surface of the structure and configuring the control system to control the surface roughness of the structure.

* * * * *